US011323465B2

(12) United States Patent
Cheng et al.

(10) Patent No.: US 11,323,465 B2
(45) Date of Patent: May 3, 2022

(54) TEMPORAL BEHAVIOR ANALYSIS OF NETWORK TRAFFIC

(71) Applicant: NEC Laboratories America, Inc., Princeton, NJ (US)

(72) Inventors: Wei Cheng, Princeton Junction, NJ (US); LuAn Tang, Pennington, NJ (US); Haifeng Chen, West Windsor, NJ (US); Bo Zong, West Windsor, NJ (US); Jingchao Ni, Princeton, NJ (US)

(73) Assignee: NEC Corporation

( * ) Notice: Subject to any disclaimer, the term of this patent is extended or adjusted under 35 U.S.C. 154(b) by 343 days.

(21) Appl. No.: 16/562,805

(22) Filed: Sep. 6, 2019

(65) Prior Publication Data

US 2020/0092315 A1    Mar. 19, 2020

Related U.S. Application Data

(60) Provisional application No. 62/733,276, filed on Sep. 19, 2018.

(51) Int. Cl.
*G06N 3/08* (2006.01)
*H04L 29/06* (2006.01)

(52) U.S. Cl.
CPC ......... *H04L 63/1425* (2013.01); *G06N 3/088* (2013.01)

(58) Field of Classification Search
CPC .... H04L 63/1425; G06N 3/088; G06N 20/10; G06N 3/0454; G06N 3/084
See application file for complete search history.

(56) References Cited

U.S. PATENT DOCUMENTS

| 8,949,677 B1* | 2/2015 | Brundage | G06F 11/3457 714/48 |
|---|---|---|---|
| 2007/0240207 A1 | 10/2007 | Belakhdar et al. | |
| 2014/0047104 A1* | 2/2014 | Rodriguez | H04L 61/1511 709/224 |
| 2015/0199224 A1* | 7/2015 | Mihnev | H04L 43/08 714/37 |
| 2018/0309637 A1* | 10/2018 | Gill | H04L 41/12 |
| 2019/0089599 A1* | 3/2019 | Savalle | H04L 67/34 |
| 2019/0158363 A1* | 5/2019 | Zhu | H04L 41/142 |

(Continued)

OTHER PUBLICATIONS

Hahsler, Clustering Data Streams Based on Shared Density between Micro-Clusters, IEEE Transactions on Knowledge and Data Engineering, vol. 28, No. 6, Jun. 2016 (Year: 2016).*

(Continued)

*Primary Examiner* — Chris Parry
*Assistant Examiner* — Weiwei Y Stiltner
(74) *Attorney, Agent, or Firm* — Joseph Kolodka

(57) ABSTRACT

Systems and methods for implementing sequence data based temporal behavior analysis (SDTBA) to extract features for characterizing temporal behavior of network traffic are provided. The method includes extracting communication and profile data associated with one or more devices to determine sequences of data associated with the devices. The method includes generating temporal features to model anomalous network traffic. The method also includes inputting, into an anomaly detection process for anomalous network traffic, the temporal features and the sequences of data associated with the devices and formulating a list of prediction results of anomalous network traffic associated with the devices.

18 Claims, 8 Drawing Sheets

(56) References Cited

U.S. PATENT DOCUMENTS

| | | | | |
|---|---|---|---|---|
| 2019/0182120 A1* | 6/2019 | Coccia | ............... | G06Q 10/06 |
| 2020/0007563 A1* | 1/2020 | Leibman | ............ | G06K 9/6247 |
| 2020/0076842 A1* | 3/2020 | Zhou | ............... | G06N 3/0454 |
| 2020/0210782 A1* | 7/2020 | Servajean | ............ | H04L 41/142 |

OTHER PUBLICATIONS

Senin, Time series anomaly discovery with grammar-based compression, Published in Proc. 18th International Conference on Extending Database Technology (EDBT), Mar. 23-27, 2015 (Year: 2015).*

Jayasree et al., "Money laundering regulatory risk evaluation using Bitmap Index-based Decision Tree", Journal of the Association of Arab Universities for Basic and Applied Sciences Jun. 1, 2017 vol. 23, Issue 1. pp. 96-102.

Lopez-Rojas et al., "Multi Agent Based Simulation (MABS) of Financial Transactions for Anti Money Laundering (AML)", Nordic Conference on Secure IT Systems Oct. 2012. Blekinge Institute of Technology. pp. 1-9.

Zhang et al., "HiDDen: Hierarchical Dense Subgraph Detection with Application to Financial Fraud Detection", Proceedings of the 2017 SIAM International Conference on Data Mining. Society for Industrial and Applied Mathematics. Jun. 30, 2017. pp. 570-578.

* cited by examiner

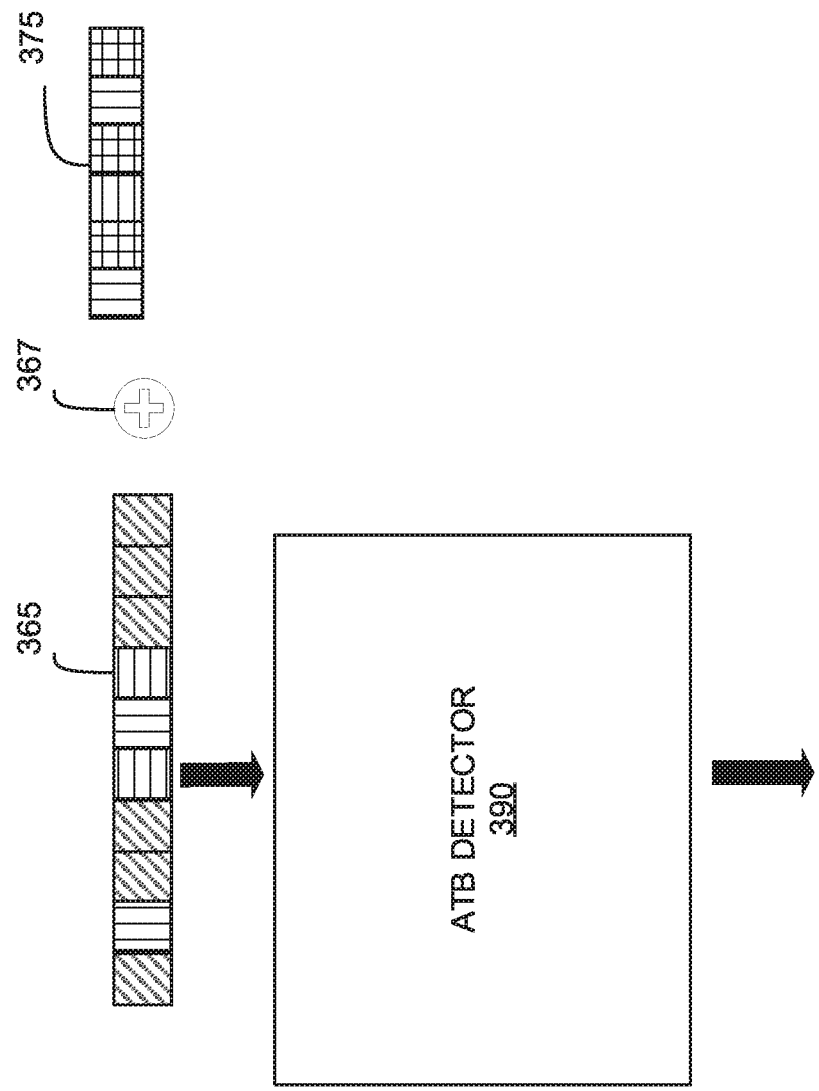

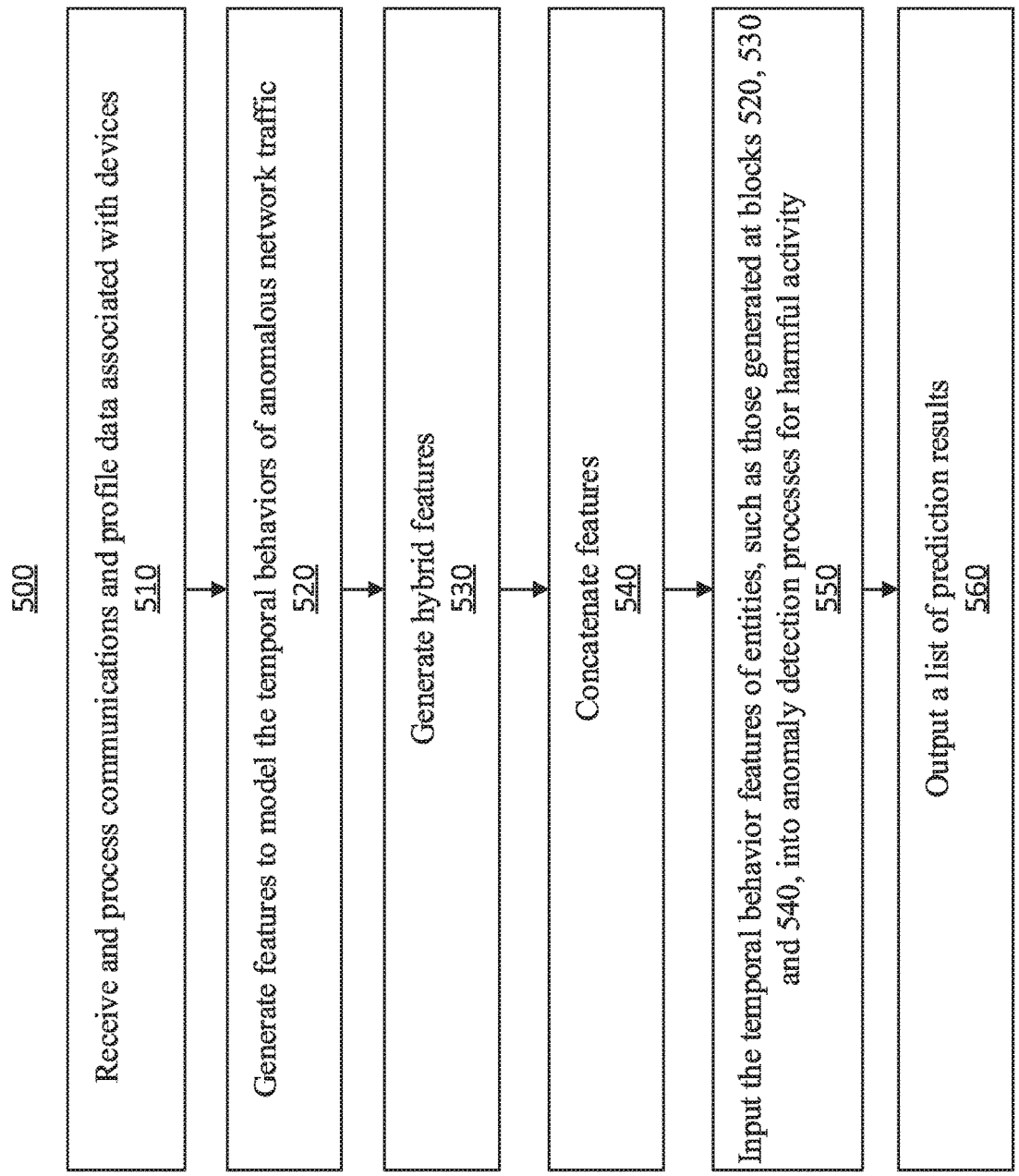

TEMPORAL BEHAVIOR ANALYSIS OF NETWORK TRAFFIC

RELATED APPLICATION INFORMATION

This application claims priority to U.S. Provisional Patent Application No. 62/733,276, filed on Sep. 19, 2018, incorporated herein by reference herein its entirety.

BACKGROUND

Technical Field

The present invention relates to deep learning and more particularly to applying deep learning for the detection of anomalous data.

Description of the Related Art

Deep learning is a machine learning method based on artificial neural networks. Deep learning architectures can be applied to fields including computer vision, speech recognition, natural language processing, audio recognition, social network filtering, machine translation, bioinformatics, drug design, medical image analysis, material inspection and board game programs, etc. Deep learning can be supervised, semi-supervised or unsupervised.

SUMMARY

According to an aspect of the present invention, a method is provided for implementing sequence data based temporal behavior analysis (SDTBA) to extract features for characterizing temporal behavior of network traffic. The method includes extracting communication and profile data associated with one or more devices to determine sequences of data associated with the devices. The method includes generating temporal features to model anomalous network traffic. The method also includes inputting, into an anomaly detection process for anomalous network traffic, the temporal features and the sequences of data associated with the devices and formulating a list of prediction results of anomalous network traffic associated with the devices.

According to another aspect of the present invention, a system is provided for implementing sequence data based temporal behavior analysis (SDTBA) to extract features for characterizing temporal behavior of network traffic. The system includes a processor device operatively coupled to a memory device. The processor device extracts communication and profile data associated with one or more devices to determine sequences of data associated with the devices. The processor device also generates temporal features to model anomalous network traffic. The processor device inputs, into an anomaly detection process for anomalous network traffic, the temporal features and the sequences of data associated with the devices and formulates a list of prediction results of anomalous network traffic associated with the devices.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 7 is a block diagram illustrating an anomalous temporal behavior (ATB) detector, in accordance with an embodiment of the present invention; and FIG. 8 is a flow diagram illustrating a method of sequence data based temporal behavior analysis (SDTBA) to extract features for characterizing temporal behavior that indicates anomalous network traffic, in accordance with an embodiment of the present invention.

DETAILED DESCRIPTION OF PREFERRED EMBODIMENTS

Figure 1:
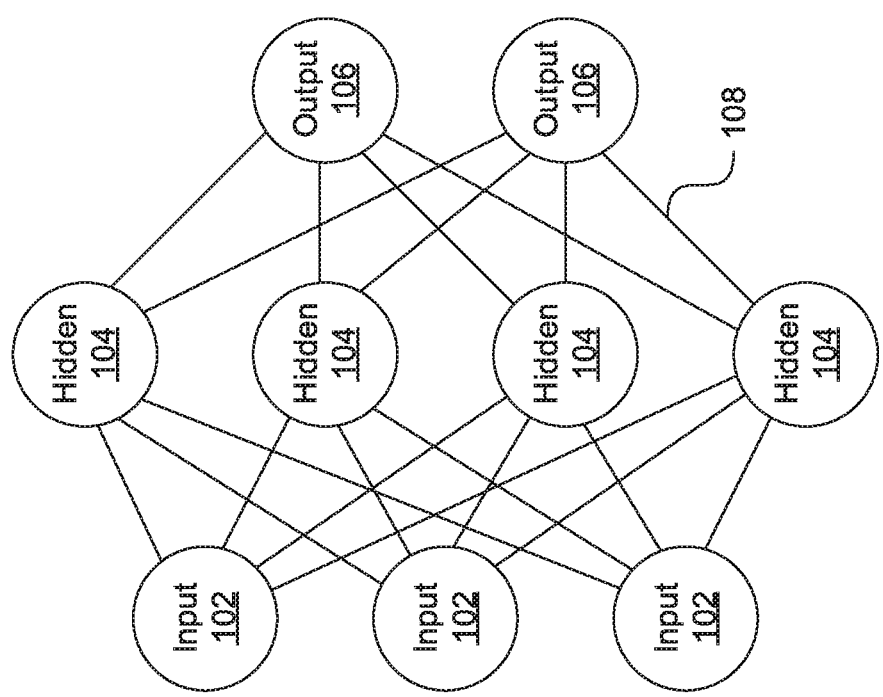
FIG. 1 is a generalized diagram of a neural network, in accordance with an embodiment of the present invention.

In accordance with embodiments of the present invention, systems and methods are provided for (for example, unsupervised) automatically extracting features for characterizing the temporal behaviors of network traffic. The features can be used for downstream analysis, such as anomaly detection techniques for detecting anomalous traffic.

In accordance with example embodiments, the systems detect anomalous network traffic. The systems characterize anomalous network traffic data and enable automatic detection of anomalous and suspicious connections based on the historical network traffic data from system logs. The systems provide temporal behavior features that characterize anomalous network traffic data and enable automatic detection of anomalous and suspicious connections based on the historical network traffic data from system logs.

In one embodiment, the systems facilitate efficient unsupervised detection in a manner that allows wide application, including in instances where training data is difficult to obtain (for example, using limited training data). The systems implement a point process based model that captures (for example, three) key temporal behaviors included (for example, that are often hidden) of anomalies, which can be used to recover the anomalous behaviors of the sequences. The methods facilitate interpretation of the detection results, providing context to the results based on the meaning of the features used for detection. SDTBA utilizes features to measure and quantify these temporal behaviors, which are effective for detecting anomalies in networked systems.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable storage medium such as a semiconductor or solid-state memory, magnetic tape, a removable computer diskette, a random-access memory (RAM), a read-only memory (ROM), a rigid magnetic disk and an optical disk, etc.

Each computer program may be tangibly stored in a machine-readable storage media or device (e.g., program memory or magnetic disk) readable by a general or special purpose programmable computer, for configuring and controlling operation of a computer when the storage media or device is read by the computer to perform the procedures described herein. The inventive system may also be considered to be embodied in a computer-readable storage medium, configured with a computer program, where the storage medium so configured causes a computer to operate in a specific and predefined manner to perform the functions described herein.

A data processing system suitable for storing and/or executing program code may include at least one processor coupled directly or indirectly to memory elements through a system bus. The memory elements can include local memory employed during actual execution of the program code, bulk storage, and cache memories which provide temporary storage of at least some program code to reduce the number of times code is retrieved from bulk storage during execution. Input/output or I/O devices (including but not limited to keyboards, displays, pointing devices, etc.) may be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Referring now to the drawings in which like numerals represent the same or similar elements and initially to FIG. 1, a generalized diagram of a neural network is shown.

An artificial neural network (ANN) is an information processing system that is inspired by biological nervous systems, such as the brain. The key element of ANNs is the structure of the information processing system, which includes many highly interconnected processing elements (called "neurons") working in parallel to solve specific problems. ANNs are furthermore trained in-use, with learning that involves adjustments to weights that exist between the neurons. An ANN is configured for a specific application, such as pattern recognition or data classification, through such a learning process.

ANNs demonstrate an ability to derive meaning from complicated or imprecise data and can be used to extract patterns and detect trends that are too complex to be detected by humans or other computer-based systems. The structure of a neural network generally has input neurons 102 that provide information to one or more "hidden" neurons 104. Connections 108 between the input neurons 102 and hidden neurons 104 are weighted and these weighted inputs are then processed by the hidden neurons 104 according to some function in the hidden neurons 104, with weighted connections 108 between the layers. There can be any number of layers of hidden neurons 104, and as well as neurons that perform different functions. There exist different neural network structures as well, such as convolutional neural network, maxout network, etc. Finally, a set of output neurons 106 accepts and processes weighted input from the last set of hidden neurons 104.

This represents a "feed-forward" computation, where information propagates from input neurons 102 to the output neurons 106. Upon completion of a feed-forward computation, the output is compared to a desired output available from training data. In example embodiments herein, the training data can include network traffic data of multiple sequences. The error relative to the training data is then processed in "feed-back" computation, where the hidden neurons 104 and input neurons 102 receive information regarding the error propagating backward from the output neurons 106. Once the backward error propagation has been completed, weight updates are performed, with the weighted connections 108 being updated to account for the received error. This represents just one variety of ANN.

Figure 2:
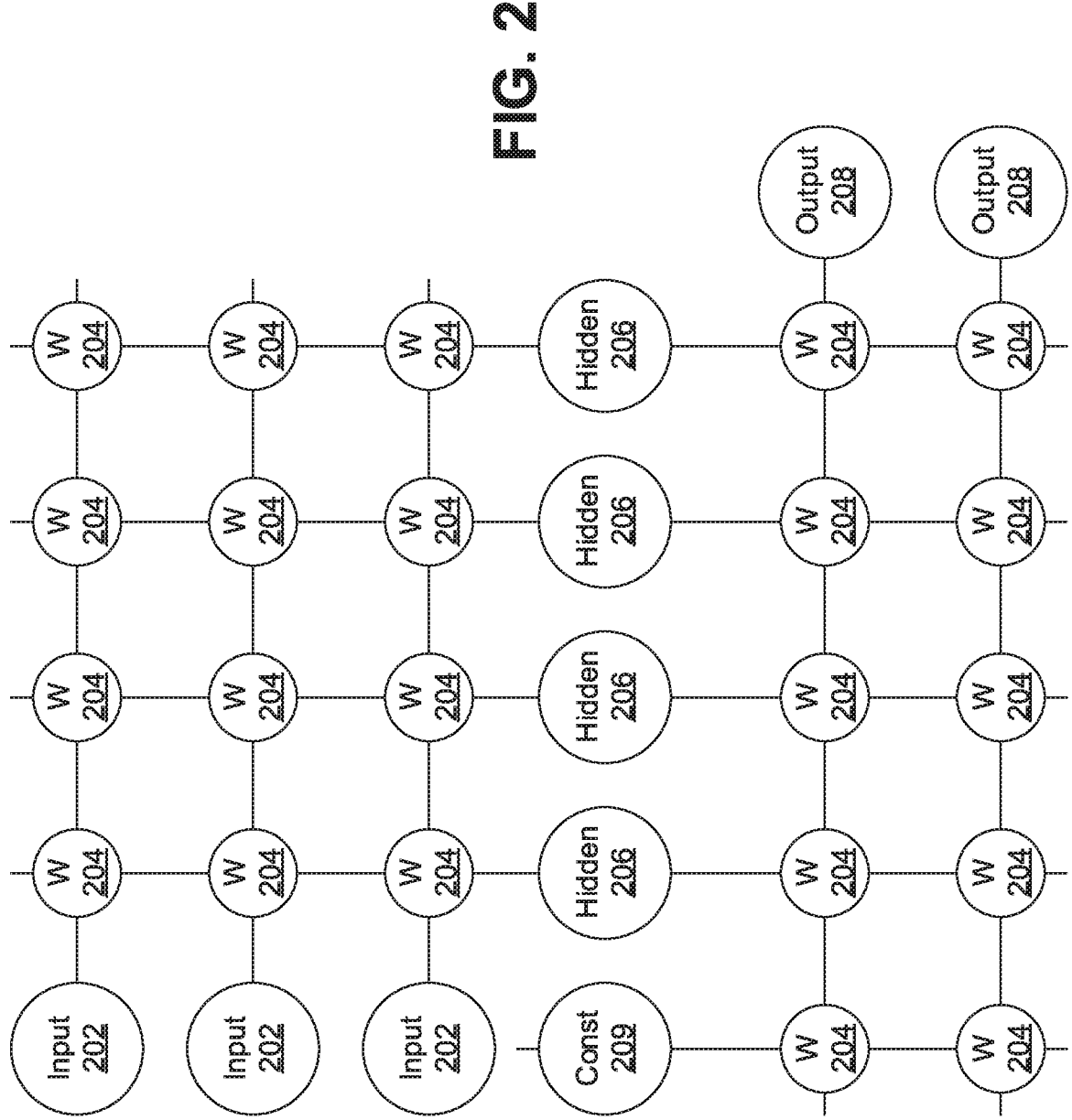
FIG. 2 is a diagram of an artificial neural network (ANN) architecture, in accordance with an embodiment of the present invention.

Referring now to FIG. 2, an artificial neural network (ANN) architecture 200 is shown. It should be understood that the present architecture is purely exemplary and that other architectures or types of neural network may be used instead. The ANN embodiment described herein is included with the intent of illustrating general principles of neural network computation at a high level of generality and should not be construed as limiting in any way.

Furthermore, the layers of neurons described below and the weights connecting them are described in a general manner and can be replaced by any type of neural network layers with any appropriate degree or type of interconnectivity. For example, layers can include convolutional layers, pooling layers, fully connected layers, stopmax layers, or any other appropriate type of neural network layer. Furthermore, layers can be added or removed as needed and the weights can be omitted for more complicated forms of interconnection.

During feed-forward operation, a set of input neurons 202 each provide an input signal in parallel to a respective row of weights 204. In the hardware embodiment described herein, the weights 204 each have a respective settable value, such that a weight output passes from the weight 204 to a respective hidden neuron 206 to represent the weighted input to the hidden neuron 206. In software embodiments, the weights 204 may simply be represented as coefficient values that are multiplied against the relevant signals. The signals from each weight adds column-wise and flows to a hidden neuron 206.

The hidden neurons 206 use the signals from the array of weights 204 to perform some calculation. The hidden neurons 206 then output a signal of their own to another array of weights 204. This array performs in the same way, with a column of weights 204 receiving a signal from their respective hidden neuron 206 to produce a weighted signal output that adds row-wise and is provided to the output neuron 208.

It should be understood that any number of these stages may be implemented, by interposing additional layers of arrays and hidden neurons 206. It should also be noted that some neurons may be constant neurons 209, which provide a constant output to the array. The constant neurons 209 can be present among the input neurons 202 and/or hidden neurons 206 and are only used during feed-forward operation.

During back propagation, the output neurons 208 provide a signal back across the array of weights 204. The output layer compares the generated network response to training data and computes an error. The error signal can be made proportional to the error value. In this example, a row of weights 204 receives a signal from a respective output neuron 208 in parallel and produces an output which adds column-wise to provide an input to hidden neurons 206. The hidden neurons 206 combine the weighted feedback signal with a derivative of its feed-forward calculation and stores an error value before outputting a feedback signal to its respective column of weights 204. This back-propagation travels through the entire network 200 until all hidden neurons 206 and the input neurons 202 have stored an error value.

During weight updates, the stored error values are used to update the settable values of the weights 204. In this manner the weights 204 can be trained to adapt the neural network 200 to errors in its processing. It should be noted that the three modes of operation, feed forward, back propagation, and weight update, do not overlap with one another.

The ANN 200 can be applied to extract features for characterizing the temporal behaviors of network traffic. ANN 200 can perform downstream analysis, such as anomaly detection techniques for detecting anomalous traffic, by implementing sequence data based temporal behavior analysis (SDTBA) to extract features for characterizing temporal behavior of network traffic as described with respect to system 300 herein below.

Figure 3:
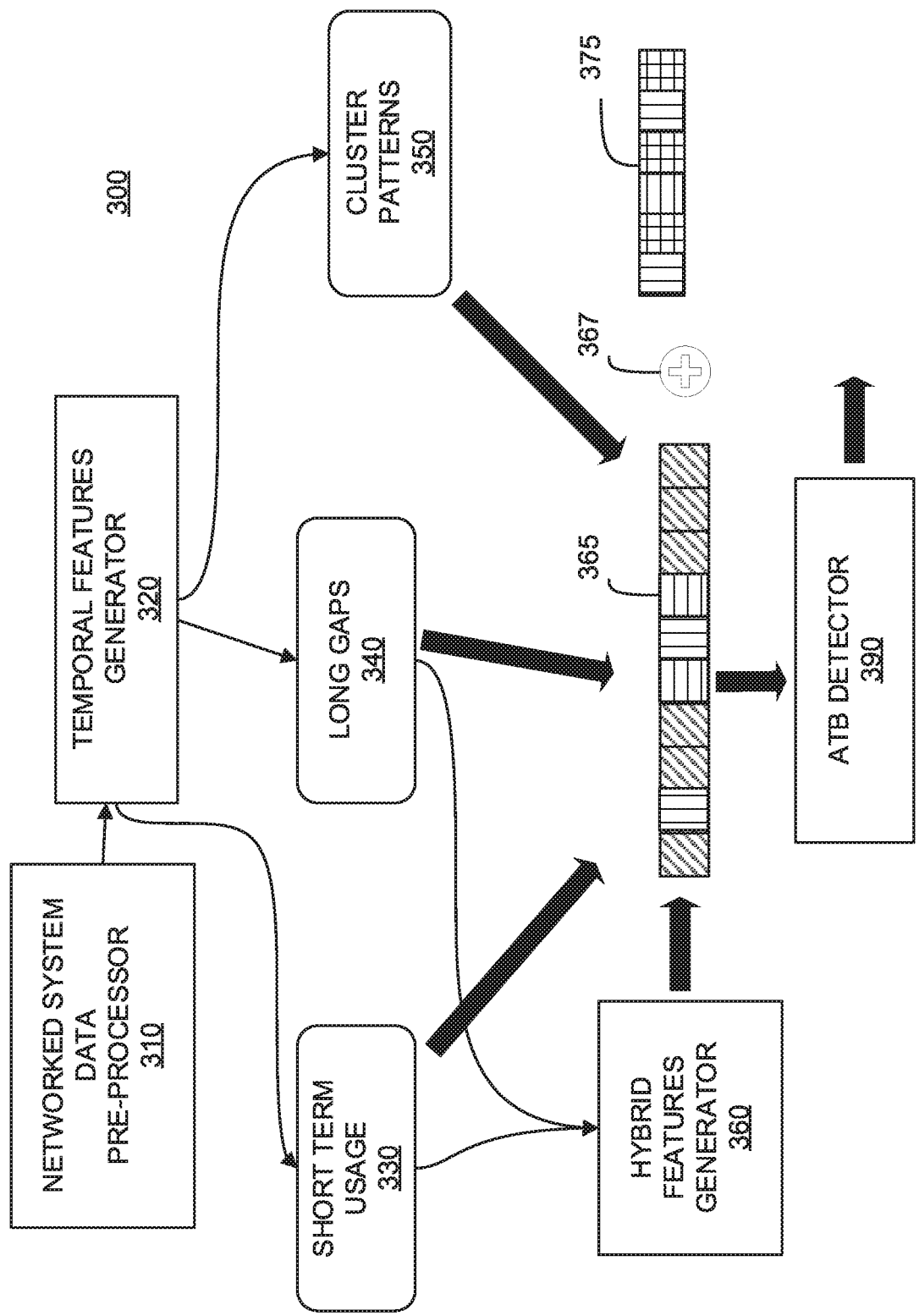
FIG. 3 is a block diagram illustrating a system that implements sequence data based temporal behavior analysis (SDTBA) to extract features for characterizing temporal behavior of network traffic, in accordance with an embodiment of the present invention.

Referring now to FIG. 3, a block diagram illustrating a system 300 for implementing SDTBA to extract features for characterizing temporal behavior of entities, in accordance with example embodiments.

FIG. 3 shows an architecture of system 300. System 300 can be referred to as a sequence data based temporal behavior analysis engine (SDTBAE) and can include a networked system data pre-processor 310, a temporal features generator 320, a hybrid features generator 360 and an anomalous temporal behavior (ATFB) detector 390.

System 300 can implement unsupervised detection of anomalous network traffic. System 300 can provide an accurate estimation of network performance for example, in an enterprise network. In example enterprise networks, multiple (for example, thousands, millions, tens of millions, etc.) of network connections are monitored by security system in every minute. System 300 can effectively analyze the traffic data collected on the network connections and timely report anomalous utility of the network sources. System 300 implements a method to design effective temporal behavior features to characterize anomalous network traffic data and enable automatic detection of anomalous and suspicious connections based on the historical network traffic data from system logs.

Networked system data pre-processor 310 processes (for example, performs preprocessing of) input communication and profile data. Networked system data pre-processor 310 processes communication and profile data to remove incomplete and duplicate data. After processing, each sequence has a sequence of time points $\{t_1, \ldots, t_n\}$, each time point $t_i$ (i=1, \ldots, n) indicates there is a process at this time point. The temporal behavior analysis can be performed based on multiple such sequences.

The data received by networked system data pre-processor 310 includes communication and profile data for severs in a network. For example, the data can include system logs of historical traffic data. Networked system data pre-processor 310 can remove incomplete and/or duplicate data. Networked system data pre-processor 310 can also perform identification (ID) matching in order to extract all valid data. The time stamps of all data can be normalized by min-max normalization with a predetermined scaling factor (for example, a factor of 100, 50, etc.) to be in a predetermined interval (for example, the interval of [0, 100]) so that the temporal behaviors of different sequences are comparable. Minmax normalization can be defined as a normalization strategy that linearly transforms x to y=(x−min)/(max−min), where min and max are the minimum and maximum values in X, where X is the set of observed values of x.

Temporal features generator 320 receives the communication and profile data and automatically generates features for different types (for example, three types) of temporal behaviors, each of the temporal behaviors corresponding to a module, such as a short term usage (processing module) 330, a long gaps (processing module) 340, and a cluster patterns (processing module) 350.

Hybrid features generator 360 generates hybrid features. Hybrid features generator 360 receives the temporal behavior features generated from temporal features generator 320 via short term usage (processing module) 330, long gap (processing module) 340, and a cluster patterns (processing module) 350. Alternatively, or additionally, the features from temporal features generator 320 can be concatenated 367 with other features 375, such as some static features and embedding features. Static features include features that characterize the essential property of the system, which are not impacted by time. For network traffic system, static features include features such as IP address, device type (server, client), etc. Embedding features are low-dimensional features that are learned from other features (such as temporal features and static features) by deep learning model. Embedding features are often more compact and informative and can capture the non-linear relationship of the original features. Thus, embedding features can help improve effectiveness and efficiency.

ATB detector 390 then receives temporal behavior features 365 (for example, on a per sequence level) as an input of anomaly detection processes. The output of ATB detector 390 can include a list of prediction result, such as described herein below with respect to FIG. 7.

System 300 can implement SDTBAE that automatically extracts features for characterizing temporal behaviors of network traffic. In particular, the features can be readily used for downstream analysis, such as anomaly detection techniques for detecting anomalous traffic. The core of SDTBAE is a point process-based model that captures (for example, three) key behaviors of anomalous network traffic with particular (for example, 11) features. The key behaviors include short term usage, long gaps between data and cluster patterns.

Figure 4:
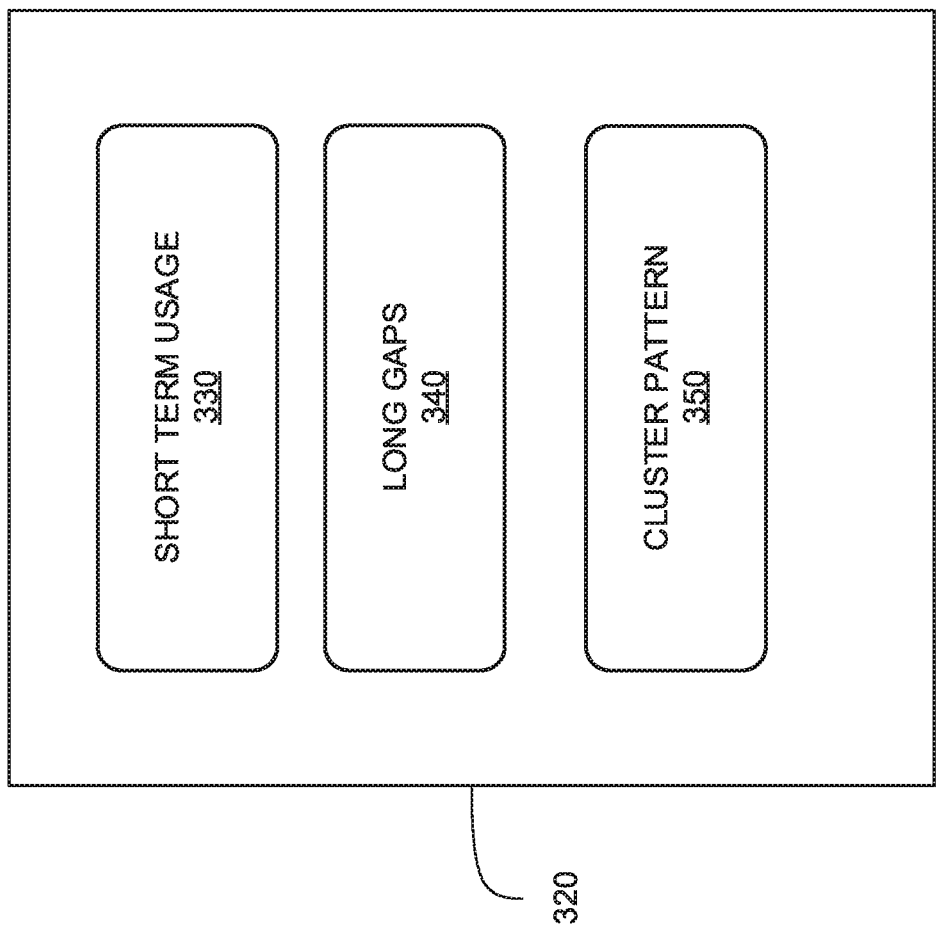
FIG. 4 is a block diagram illustrating a temporal feature generator, in accordance with an embodiment of the present invention.

FIG. 4 is a block diagram of temporal features generator 320, in accordance with example embodiments.

Temporal features generator 320 generates features to characterize key temporal behaviors of network traffic. In one example temporal features generator 320 generates features to characterize key temporal behaviors of network connections (and associated entities) that provide suspicious connections.

With regard to network traffic, these features can include short term usage (short term usage 330), which means that the anomalies tend to generate a sequence of data in a short term during the monitoring time, long gaps between data (long gaps 340), which means that the anomalies tend to generate data infrequently, with a long gap between consecutive processes, and cluster patterns (cluster patterns 350), which means that the anomalies tend to generate data intensively in a short time and have multiple intensive periods during the monitoring time.

Short term usage 330 can generate features to characterize patterns of anomalous network traffic. According to example embodiments, a pattern of short-term usage can be characterized based on an interval of use and number of time points.

An interval of use can be defined as Intv=$t_{max}$-$t_{min}$ for each sequence, where $t_{max}$ is the maximal time point of the sequence, $t_{min}$ is the minimal time point of the sequence. A small value of Into indicates that the sequences a sequence in a small period (for example, a below a predetermined maximum interval) of the (for example, whole) monitoring time.

The number of time points can be defined as n for $\{t_1, \ldots, t_n\}$. If a sequence has data in a small window of the whole monitoring time, the sequence tends to have a small value of n. On the other hand, if a sequence has data throughout the monitoring time, that sequence tends to have a large value of n. Moreover, if a sequence has a small n but the data are distributed in a large period of the monitoring time, the sequence also tends to be anomalous.

Long gaps between data 340 can select a single feature to characterize this pattern, which is the maximal gap of no data. The definition of the maximal gap of no data is maxgap=$\max_{1 \leq i \leq k-1}(t_{i+1}-t_i)$. If a sequence has a large value of maxgap, the sequence tends to have multiple long gaps during which there is no data. Long gaps between data 340 can define this behavior as an anomalous behavior.

Cluster patterns 350 can select different features to characterize patterns of clustered activity that are consistent with anomalous network traffic. For example, cluster patterns 350 can characterize this pattern using features, such as maximal density, minimal density, min-max density ratio, counts of bins with high density and counts of bins with low density, etc.

The definition of maximal density is:

$$\text{max density} = \max_{1 \leq window \leq T} \frac{\text{\# time points in window}}{\text{total \# time points}}$$

where there is a window of size T sliding the entire monitoring time of each sequence. For each sliding window, the density can be calculated using the formula within the max operation in the above equation. The maximal density is the maximal value of the densities of all sliding windows.

If a sequence has a large value of maximal density, then there are some regions in the sequence that involve intensive data, which is consistent with (for example, implies) a cluster pattern.

The definition of minimal density is:

$$\text{min density} = \min_{1 \leq window \leq T} \frac{\text{\# time points in window}}{\text{total \# time points}}$$

where there is a window of size T sliding the entire (for example, whole) monitoring time of each sequence. For each sliding window, the density is calculated using the formula within the max operation in the above equation. The minimal density is the minimal value of the densities of all sliding windows.

If a sequence has a large value of minimal density, then there are some regions in the sequence that involve scarce data, which implies a cluster pattern.

The definition of min-max density ratio is:

$$\text{min} - \text{max density ratio} = \frac{\text{min density}}{\text{max density}}$$

which is a combination of maximal density and minimal density. The value of min-max density ratio is small for a sequence if the sequence has both intensive regions and scarce regions in its data. This implies a cluster pattern.

The definition of counts of bins with high density is:

$$\text{bin value} = \begin{cases} 1 & \text{if density} \geq \text{threshold} \\ 0 & \text{otherwise} \end{cases}$$

$$\text{bin count} = \text{sum of bin values}$$

where the whole monitoring time is divided into multiple windows, each window corresponds to one bin. The density of time points in each bin is calculated. If the density is larger than a predefined threshold, the value of the density is set as 1. The counts of bins with high density is the sum of such values for all bins.

If a sequence has a large value of counts of bins with high density, then there are multiple regions in the sequence that involve intensive transactions, which implies a cluster pattern.

Counts of bins with low density. The definition of counts of bins with low density is $$\text{bin value} = \begin{cases} 1 & \text{if density} \leq \text{threshold} \\ 0 & \text{otherwise} \end{cases}$$

where the whole monitoring time is divided into multiple windows, each window corresponds to one bin. The density of time points in each bin is calculated. If the density is lower than a predefined threshold, the value of the density is set as 1. The counts of bins with low density is the sum of such values for all bins.

If a sequence has a large value of counts of bins with low density, then there are multiple regions in the sequence that involve scarce data, which implies a cluster pattern.

Figure 5:
FIG. 5 is a block diagram illustrating a hybrid features generator, in accordance with an embodiment of the present invention.

FIG. 5 is a block diagram illustrating a hybrid features generator 360, in accordance with example embodiments.

Hybrid features generator 360 combines temporal features (such as described above with respect to FIG. 4) to provide insight regarding the temporal behaviors of sequences associated with illegal activity. Hybrid features generator 360 generates (for example, three) hybrid features by combining the features generated in short term usage 330 and long gaps 340. For example, hybrid features generator 360 can generate features, such as an interval-gap ratio, an interval-time point number ratio and a time point number-gap ratio.

The definition of interval-gap ratio is $$intv - \text{gap ratio} = \frac{\text{interval of data}}{\text{max gap of no data}}.$$

As described with respect to FIG. 4, particularly with respect to interval of use and long gaps between data, a small value of interval-gap ratio indicates an anomalous behavior.

The definition of interval-time point number ratio is $$intv - tp \text{ number ratio} = \frac{\text{interval of data}}{\text{number of time points}}.$$

As described with respect to FIG. 4, particularly with respect to number of time points and long gaps between data, a small value of interval-time point number ratio indicates an anomalous behavior.

The definition of time point number-gap ratio is $$tp \text{ number} - \text{gap ratio} = \frac{\text{number of time points}}{\text{max gap of no data}}.$$

As described with respect to FIG. 4, particularly with respect to number of time points and long gaps between data, a small value of time point number-gap ratio indicates an anomalous behavior.

Figure 6:
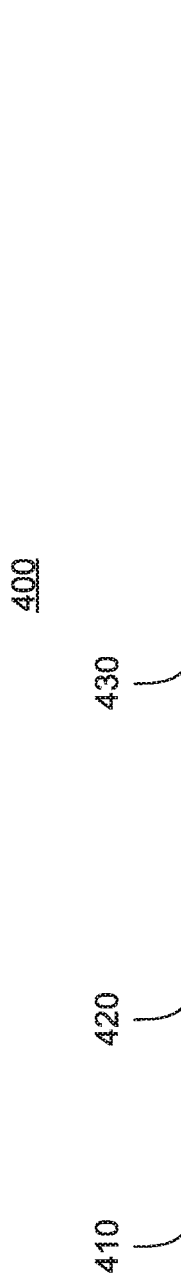
FIG. 6 is an example table illustrating a summary of temporal behavior features, in accordance with an embodiment of the present invention.

FIG. 6 is an example table illustrating a summary of temporal behavior features, in accordance with example embodiments.

As shown in FIG. 6, table 400 includes columns for an index 410 (1 to 11), a feature 420 and a description 430 (of what the feature includes). Table 400 provides a summary of temporal behavior features generated by the SDTBAE system 300, together with descriptions of the features.

Intv (feature 420, index 1) as described above with respect to FIG. 4, defines an Interval of data: tmax-tmin.

tp_nums (index 2) as described above with respect to FIG. 4, defines a number (#) of time points.

gap_max (feature 420, index 3) as described above with respect to FIG. 4, defines a maximal gap of no data.

i_g_ratio (feature 420, index 4) as described above with respect to FIG. 5, defines an interval-gap ratio, can be determined by combining features indexed 1 and 3. For example, i_g_ratio can be determined by dividing the Intv (feature 420, index 1) by the maximal gap of no data (index 3).

i_t_ratio (feature 420, index 5) as described above with respect to FIG. 5, defines an interval-time point number ratio, can be determined by combining features indexed 1 and 2. For example, i_t_ratio can be determined by dividing the Intv (feature 420, index 1) by the number of time points (index 2).

t_g_ratio (feature 420, index 6) as described above with respect to FIG. 5, defines an interval-gap ratio, can be determined by combining features indexed 2 and 3. For example, t_g_ratio can be determined by dividing a number of time points (index 2) by the maximal gap of no data (index 3).

density_max (feature 420, index 7) as described above with respect to FIG. 4, defines a maximal density.

density_min (feature 420, index 8) as described above with respect to FIG. 4, defines a minimal density.

density_ratio (feature 420, index 9) as described above with respect to FIG. 4, defines a min-max density ratio by combining features indexed 7 and 8. For example, density_ratio can be determined by dividing a number of time points (index 2) by the maximal gap of no data (index 3).

bin_cnt_1 (feature 420, index 10) as described above with respect to FIG. 4, defines a number (#) of bins such that the densities in bins are greater than a (for example, predetermined) threshold.

bin_cnt_0 (feature 420, index 11) as described above with respect to FIG. 4, defines a number (#) of bins such that the densities in bins are 0 (zero).

These indexed features (and, in some instances, corresponding values for communications and profile data and/or sequence identifying data) can be input to ATB detector 390.

FIG. 7 is a block diagram illustrating an anomalous temporal behavior (ATB) detector, in accordance with example embodiments.

As shown in FIGS. 3 and 7, ATB detector 390 receives the temporal behavior features generated from temporal features generator 320, such as described herein above with respect to FIGS. 3 and 4. ATB detector 390 uses these features as an input of anomaly detection processes. Alternatively (or additionally/optionally), the features from temporal features generator 320 can be concatenated with other features, such as some static features and embedding features. The anomaly detection processes can implement predetermined anomaly detection techniques for vector data (such as, for example, a customized anomaly detection technique for anomalous network traffic detection, density-based spatial clustering of applications with noise (DBSCAN), isolation forest, one-class support vector machine (SVM), etc.).

ATB detector 390 outputs a list of prediction results, where, according to an example embodiment, value 1 means a sequence is anomalous and value 0 means a sequence is normal. ATB detector 390 detects anomalous network traffic based on features generated by temporal features generator 320 (including those managed by short term data 330, long gaps 340, and cluster patterns 350) and can combine these features with other features from other sources (for example, engines, etc.), or can use the features independently to detect anomalous network traffic.

ATB detector 390 can send a report of the anomalous network traffic sequences (and detected associated sources of the network traffic). In instances in which ATB detector 390 detects anomalous network traffic associated with one or more sequences, ATB detector 390 can send identifying information for the sequence(s). In an example embodiment, ATB detector 390 can also include a type of feature associated with the detected sequence and other information relevant to identifying anomalous network traffic, such as when the source of the traffic, etc.

System 300, and particularly ATB detector 390, can implement analysis in instances in which there is limited (for example, scarce, etc.) training data. In many instances training data for anomalous network traffic detection can be difficult to obtain. In these instances, in which the data for model training can be very scarce, system 300, and particularly ATB detector 390, can implement an unsupervised method without training phase. System 300, and particularly ATB detector 390, can perform such detection in an unsupervised setting with (for example, little or no) prior knowledge about the testing data.

System 300 implements features for characterizing network traffic in a manner that overcomes the limitations of dimensionality. The example embodiments can include features engineered for effective detection. System 300 can be implemented in an unsupervised process with low sensitivity to high dimensionality of data, including in instances when (for example, many) features are irrelevant and/or noisy.

According to example embodiments, system 300 can provide notification of anomalous network traffic with high recall.

System 300 can provide explanation of detection results. Given detection results, system 300 can provide information and/or an explanation to users that enables understanding of why some of the sequences are detected as abnormal. In other words, system 300 can enable interpretation on which features are important to determine detection boundary (for example, why one sequence is grouped within the network traffic and why another is not).

FIG. 8 is a flow diagram illustrating a method 500 for implementing sequence data based temporal behavior analysis (SDTBA) to extract features for characterizing temporal behavior of anomalous network traffic, in accordance with the present invention.

At block 510, system 300 receives and processes communications and profile data associated with one or more devices. System 300 can receive data including communications and profile data (for example, from a database). System 300 can remove incomplete and duplicate data. System 300 can also perform id matching in order to extract all valid data.

At block 520, system 300 generates temporal features to model the temporal behaviors of anomalous network traffic (for example, cyber security risks, etc.), such as suspicious network connections, etc. System 300 does not need any information in advance (e.g., training datasets, pre-defined models, etc.). Thus, system 300 can be implemented for unsupervised anomaly detection and also for the real deployment scenario in which the end users are unfamiliar with the data (for example, do not know the data very well). System 300 includes temporal features designed to facilitate automatic detection in an unsupervised setting.

The temporal features can be hidden features that are not available in individual data but are available in the sequences of data. The generated features do not have a very high dimensionality and thus are feasible for most existing anomaly detection methods and also for fast implementation. These features can include short term data, long gaps between data and clustering.

Generating temporal features can include generating a cluster pattern feature. The cluster pattern is determined based on a density of time points. Each time point $t_i$ j(i=1, . . . , n) indicates there is a data (for example, generated, received, communicated, etc.) at that time point.

At block 530, system 300 generates hybrid features. These can include features that are hybrids of the temporal features determined at block 530.

At block 540, system 300 can concatenate features determined at block 520 with other features, such as some static features and embedding features.

At block 550, system 300 inputs the temporal behavior features of anomalous network traffic, such as (for example, any of) those generated at blocks 520, 530 and 540, into anomaly detection processes for harmful (for example, illegal financial, cybersecurity risk, etc.) activity, such as DBSCAN, one-class SVM and Isolation Forest, etc. These anomaly detection processes can be used to detect anomalous instances (e.g., network traffic from computing devices in a network system) from a large pool of samples (mixed together normal and anomalous ones), without using predefined labels.

At block 560, system 300 formulates and outputs a list of prediction results, where value 1 means a sequence is anomalous and value 0 means a sequence is normal. The features enable good interpretation of the results. That is, the end users can understand the detection results through the meaning of the features used for detection. The list can include prediction results of harmful entities among the entities. Further action can be executed based on the prediction results, such as blocking network connections from the entities, flagging sequences or devices, etc.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A method for implementing sequence data based temporal behavior analysis (SDTBA) to extract features for characterizing temporal behavior of network traffic, comprising:

extracting communication and profile data associated with at least one device to determine a plurality of sequences of data associated with the at least one device;

generating, by a processor device, at least one temporal feature to model anomalous network traffic;

generating a maximum density feature by generating, for each sequence, a sliding window of size T that slides an entire monitoring time of each sequence and determining:

$$\text{max density} = \max_{1 \leq window \leq T} \frac{\text{\# time points in window}}{\text{total \# time points}},$$

wherein a maximal density is a maximal value of densities of all sliding windows of the plurality of sequences:

inputting, into at least one anomaly detection process for anomalous network traffic, the at least one temporal feature and the plurality of sequences of data associated with the at least one device; and formulating a list of prediction results of anomalous network traffic associated with the at least one device.

2. The method as recited in claim 1, wherein extracting the communication and profile data associated with the at least one device further comprises:

determining, for each of the plurality of sequences, a sequence of time points $\{t_1, \ldots, t_n\}$, each time point $t_i$(i=1, . . . , n) indicates there is data at that time point.

3. The method as recited in claim 1, wherein extracting the communication and profile data associated with the at least one device further comprises:

normalizing each time stamp of the communication and profile data by min-max normalization.

4. The method as recited in claim 1, wherein generating the at least one temporal feature further comprises:

generating a short-term usage feature, wherein short-term usage is determined based on interval of data and a number of time points.

5. The method as recited in claim 1, wherein generating the at least one temporal feature further comprises:
generating a long gap between data feature, wherein a maximal gap of no data is defined as:

$$\text{maxgap} = \max_{1 \leq i \leq k-1}(t_{i+1} - t_i),$$

wherein each time point $t_i (i=1, \ldots, n)$ indicates there is data at that time point.

6. The method as recited in claim 1, wherein generating the at least one temporal feature further comprises:
generating a cluster pattern feature, wherein a cluster pattern is determined based on a density of time points, wherein each time point $t_i(i=1, \ldots, n)$ indicates there is a data at that time point.

7. The method as recited in claim 6, wherein generating the cluster pattern feature further comprises:
generating one or more of the maximal density feature, a minimal density feature, a min-max density ratio feature, a count of bins with high density feature and a count of bins with low density feature.

8. The method as recited in claim 7, wherein generating the minimal density feature further comprises:
generating, for each sequence, a sliding window of size T that slides an entire monitoring time of each sequence and determining:

$$\text{min density} = \min_{1 \leq window \leq T} \frac{\text{\# time points in window}}{\text{total \# time points}}$$

wherein a minimal density is a minimal value of densities of all sliding windows of the plurality of sequences.

9. The method as recited in claim 1, wherein inputting, into the at least one anomaly detection process for anomalous network traffic, further comprises:
inputting to at least one of density-based spatial clustering of applications with noise (DBSCAN), isolation forest, and one-class support vector machine to detect anomalies.

10. The method as recited in claim 1, wherein inputting, into the at least one anomaly detection process for anomalous network traffic, further comprises:
implementing the at least one anomaly detection process as an unsupervised process.

11. A computer system for implementing sequence data based temporal behavior analysis (SDTBA) to extract features for characterizing temporal behavior of network traffic, comprising:
a processor device operatively coupled to a memory device, the processor device being configured to:
extract communication and profile data associated with at least one device to determine a plurality of sequences of data associated with the at least one device;
generate at least one temporal feature to model anomalous network traffic;
generate a maximum density feature by generating, for each sequence, a sliding window of size T that slides an entire monitoring time of each sequence and determining:

$$\text{max density} = \max_{1 \leq window \leq T} \frac{\text{\# time points in window}}{\text{total \# time points}},$$

wherein a maximal density is a maximal value of densities of all sliding windows of the plurality of sequences;

input, into at least one anomaly detection process for anomalous network traffic, the at least one temporal feature and the plurality of sequences of data associated with the at least one device; and
formulate a list of prediction results of anomalous network traffic associated with the at least one device.

12. The system as recited in claim 11, wherein, when extracting the communication and profile data associated with the at least one device, the processor device is further configured to:
determine, for each of the plurality of sequences, a sequence of time points $\{t_1, \ldots, t_n\}$, each time point $t_i(i=1, \ldots, n)$ indicates there is data at that time point.

13. The system as recited in claim 11, wherein, when extracting communication and profile data associated with the at least one device, the processor device is further configured to:
normalize each time stamp of the communication and profile data by min-max normalization.

14. The system as recited in claim 11, wherein, when generating the at least one temporal feature, the processor device is further configured to:
generate a short-term usage feature, wherein short-term usage is determined based on interval of data and number of time points.

15. The system as recited in claim 11, wherein, when generating the at least one temporal feature, the processor device is further configured to:
generate a long gap between data feature, wherein a maximal gap of no data is defined as:

$$\text{maxgap} = \max_{1 \leq i \leq k-1}(t_{i+1} - t_i),$$

wherein each time point $t_i(i=1, \ldots, n)$ indicates there is data at that time point.

16. The system as recited in claim 11, wherein, when generating the at least one temporal feature, the processor device is further configured to:
generate a cluster pattern feature, wherein a cluster pattern is determined based on a density of time points, wherein each time point $t_i(i=1, \ldots, n)$ indicates there is data at that time point.

17. The system as recited in claim 16, wherein, when generating the cluster pattern feature, the processor device is further configured to:
generate one or more of the maximal density feature, a minimal density feature, a min-max density ratio feature, a count of bins with high density feature and a count of bins with low density feature.

18. A computer program product for implementing sequence data based temporal behavior analysis (SDTBA) to extract features for characterizing temporal behavior of network traffic, the computer program product comprising a non-transitory computer readable storage medium having program instructions embodied therewith, the program instructions executable by a computing device to cause the computing device to perform the method comprising:
extracting communication and profile data associated with at least one device to determine a plurality of sequences of data associated with the at least one device;
generating, by a processor device, at least one temporal feature to model anomalous network traffic;
generating a maximum density feature by generating, for each sequence, a sliding window of size T that slides an entire monitoring time of each sequence and determining:

$$\text{max density} = \max\nolimits_{1 \leq window \leq T} \frac{\text{\# time points in window}}{\text{total \# time points}},$$

wherein a maximal density is a maximal value of densities of all sliding windows of the plurality of sequences;
  inputting, into at least one anomaly detection process for anomalous network traffic, the at least one temporal feature and the plurality of sequences of data associated with the at least one device; and
  formulating a list of prediction results of anomalous network traffic associated with the at least one device.

\* \* \* \* \*